United States Patent [19]

Smith et al.

[11] Patent Number: 5,015,144
[45] Date of Patent: May 14, 1991

[54] APPARATUS FOR LOADING MATERIALS INTO A STORAGE COMPARTMENT AND ASSOCIATED FLUID PRESSURE DELIVERY SYSTEM

[75] Inventors: Fred T. Smith; Fred P. Smith, both of Palos Verdes Peninsula, Calif.

[73] Assignee: The Heil Co., Brookfield, Wis.

[21] Appl. No.: 322,309

[22] Filed: Mar. 13, 1989

[51] Int. Cl.$^5$ ............................................. B60P 1/00
[52] U.S. Cl. ........................... 414/525.2; 414/525.52; 414/525.5; 414/525.54
[58] Field of Search ............... 414/509, 511, 512, 516, 414/525.2, 525.5, 525.51, 525.53, 525.54; 100/269 R, 233, 50; 91/516, 517, 519

[56] References Cited

U.S. PATENT DOCUMENTS

| | | | |
|---|---|---|---|
| 4,034,563 | 7/1977 | Orth | 91/516 X |
| 4,180,365 | 12/1979 | Herpich et al. | 414/525.52 |
| 4,337,620 | 7/1982 | Johnson | 91/517 X |
| 4,522,551 | 6/1985 | Henneberry | 414/525.52 X |
| 4,833,971 | 5/1989 | Kubik | 91/519 X |

OTHER PUBLICATIONS

Trade Brochure (1961) entitled "Daybrook Speedlift Power Packer".
Trade Brochure (1962) entitled "E-Z Pack Rear End Loader".

*Primary Examiner*—H. Grant Skaggs
*Assistant Examiner*—Keith L. Dixon
*Attorney, Agent, or Firm*—Paul R. Puerner

[57] ABSTRACT

A fluid pressure system comprises first and second members each movable in response to fluid pressure to individually exert a force. A linkage arrangement couples the first member with the second member for moving the second member in response to movement of the first member, and vice versa. Fluid pressure is conveyed to the first and second members at a pressure that varies according to the work load encountered by the first and second members in response to a control mechanism. The contro mechanism includes a first sensor that senses the variable fluid pressure and a first valve associated with the first sensor. The first valve is operative, when the sensed fluid pressure is less than a predetermined threshold value, for opening the conveyance of fluid pressure to the first member while closing the conveyance of fluid pressure to the second member so that, as the first and second members move together, only the first member exerts a force. The first valve is further operative, when the sensed fluid pressure equals or exceeds the threshold value, for opening the conveyance of fluid pressure to both the first and second members so that, as the first and second members move together, both the first and second members individually exert a force. An apparatus for loading materials from a hopper into a storage container employing the above-described fluid pressure delivery system is also provided.

32 Claims, 10 Drawing Sheets

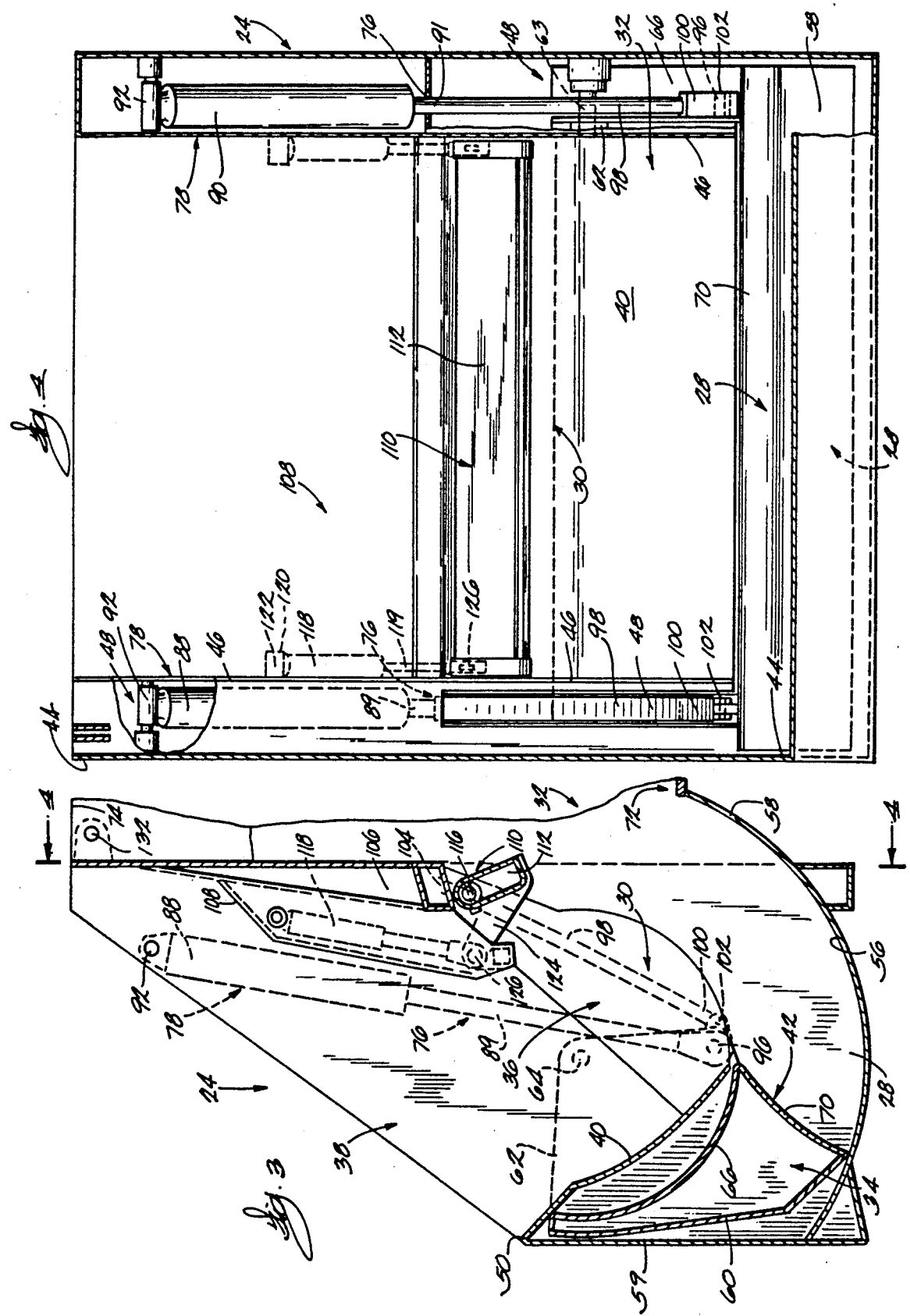

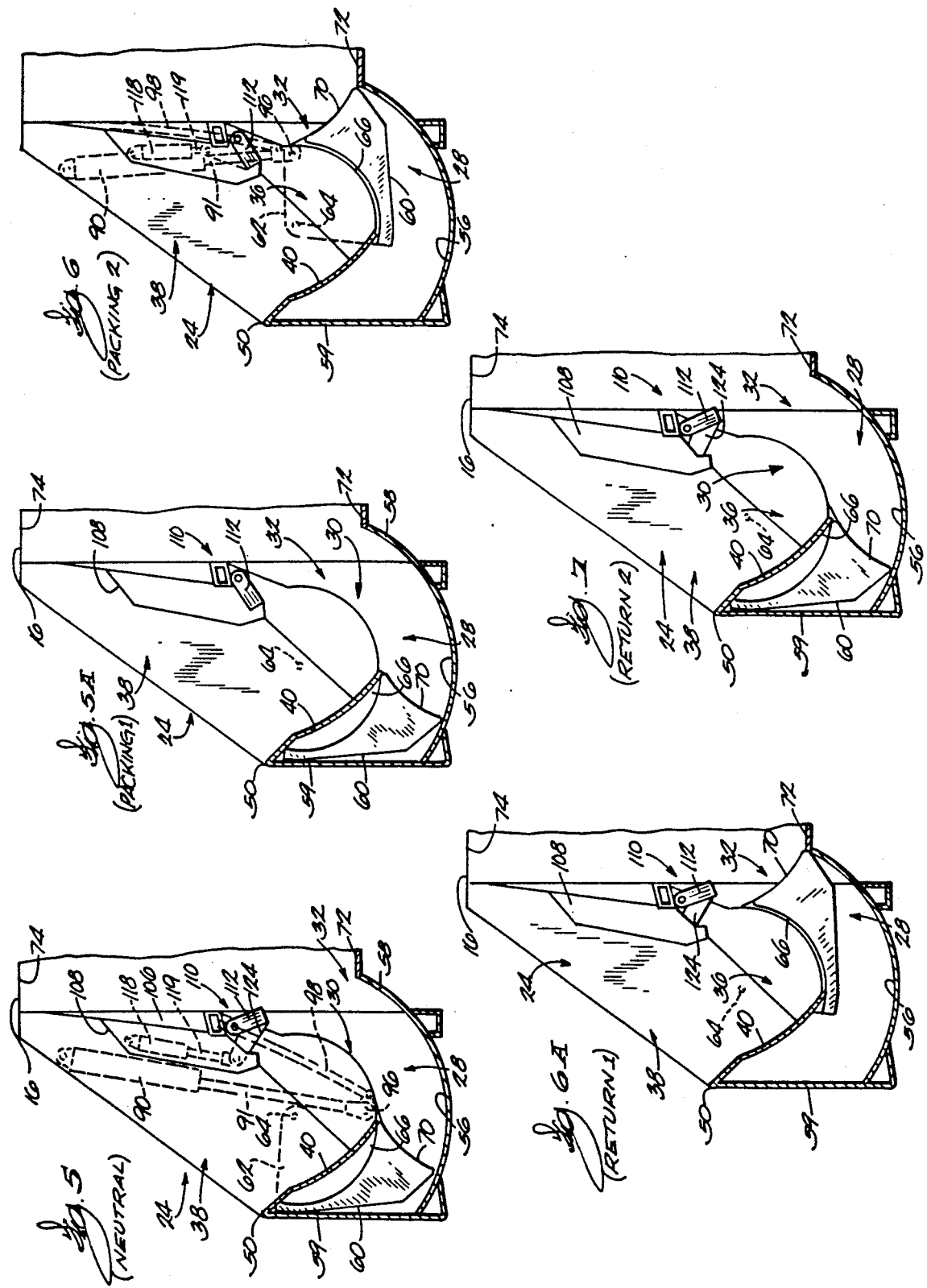

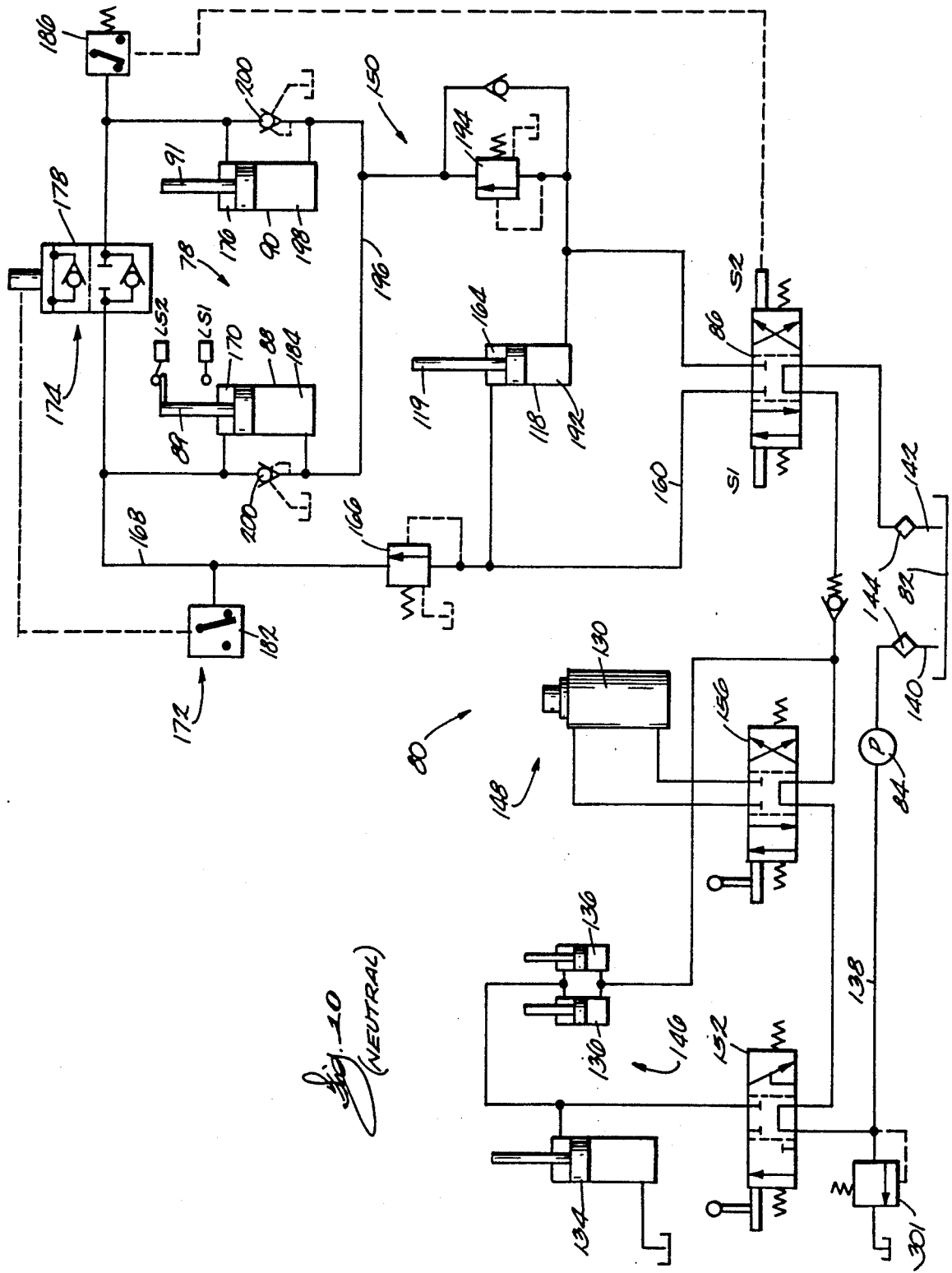
Fig. 10 (NEUTRAL)

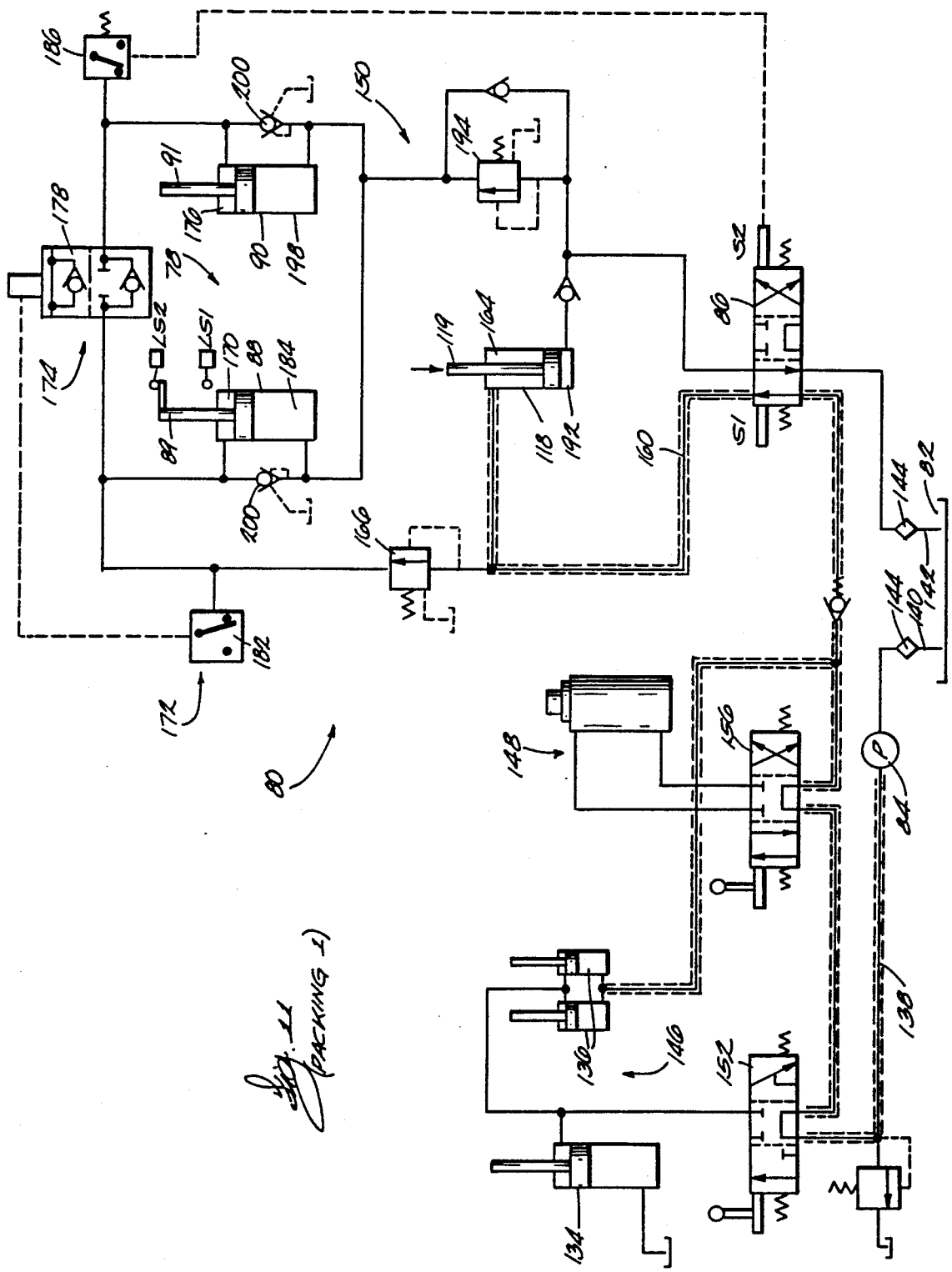

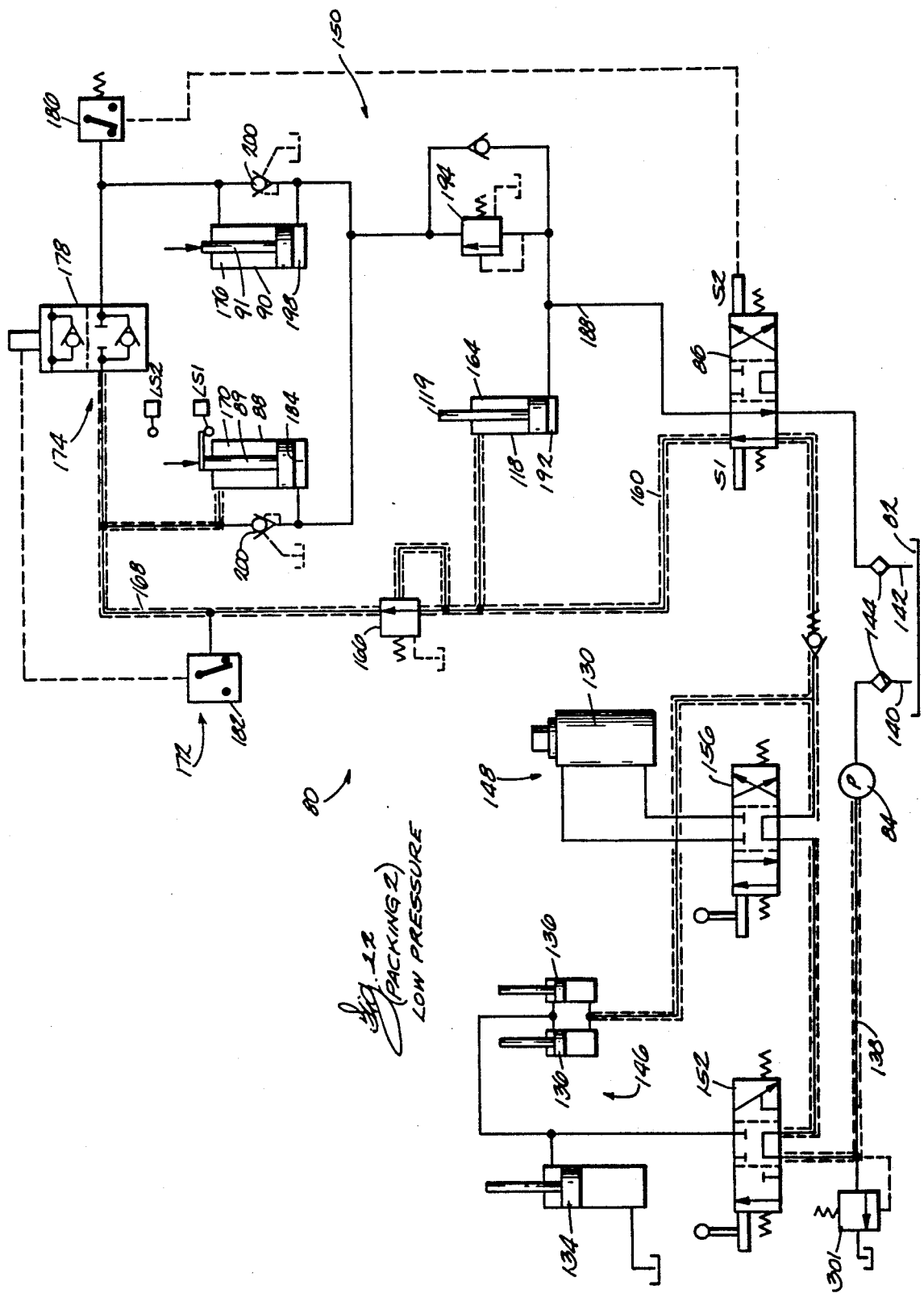
Fig. 17 (PACKING 2) LOW PRESSURE

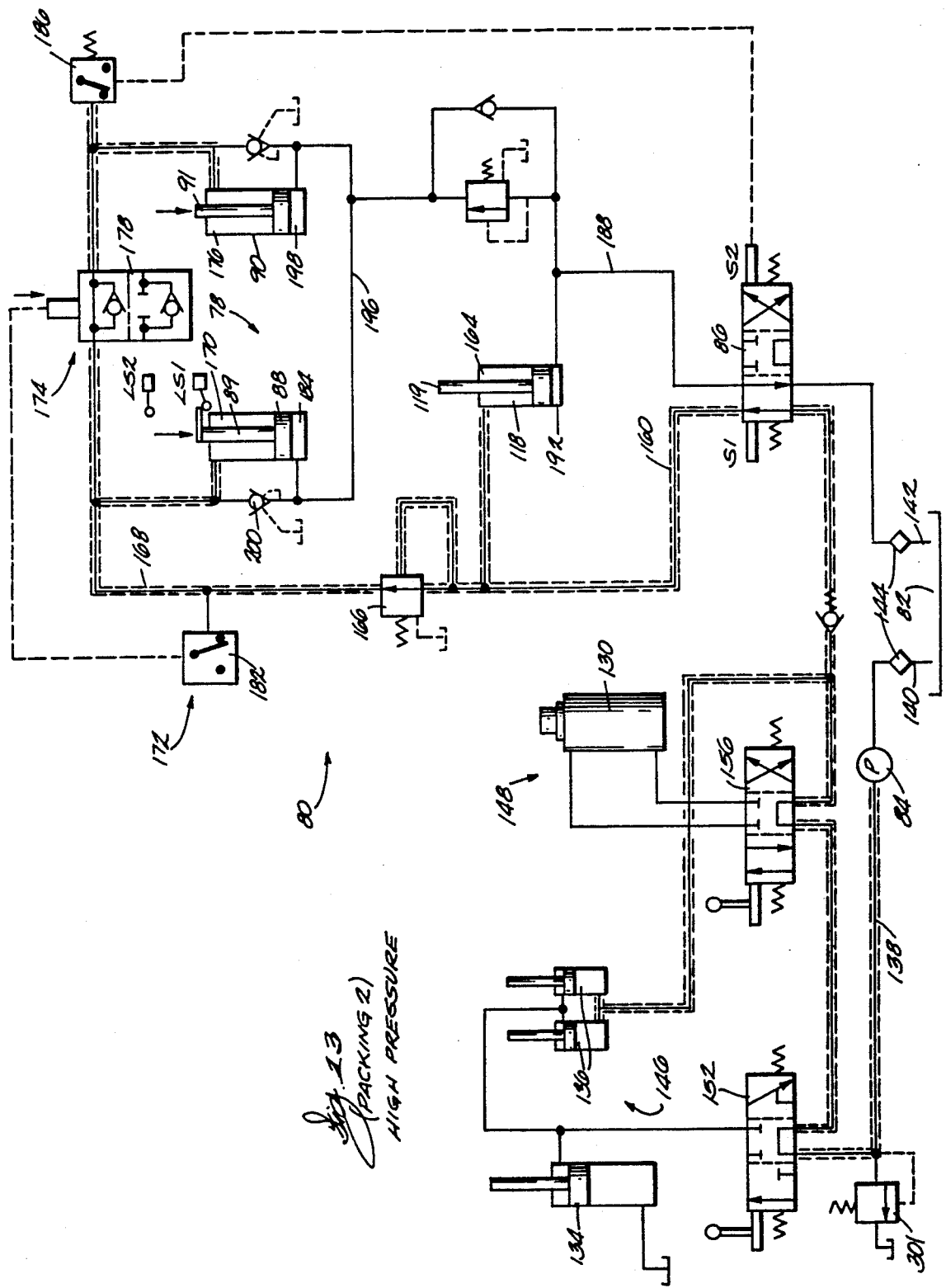
Fig. 13 (PACKING 2) HIGH PRESSURE

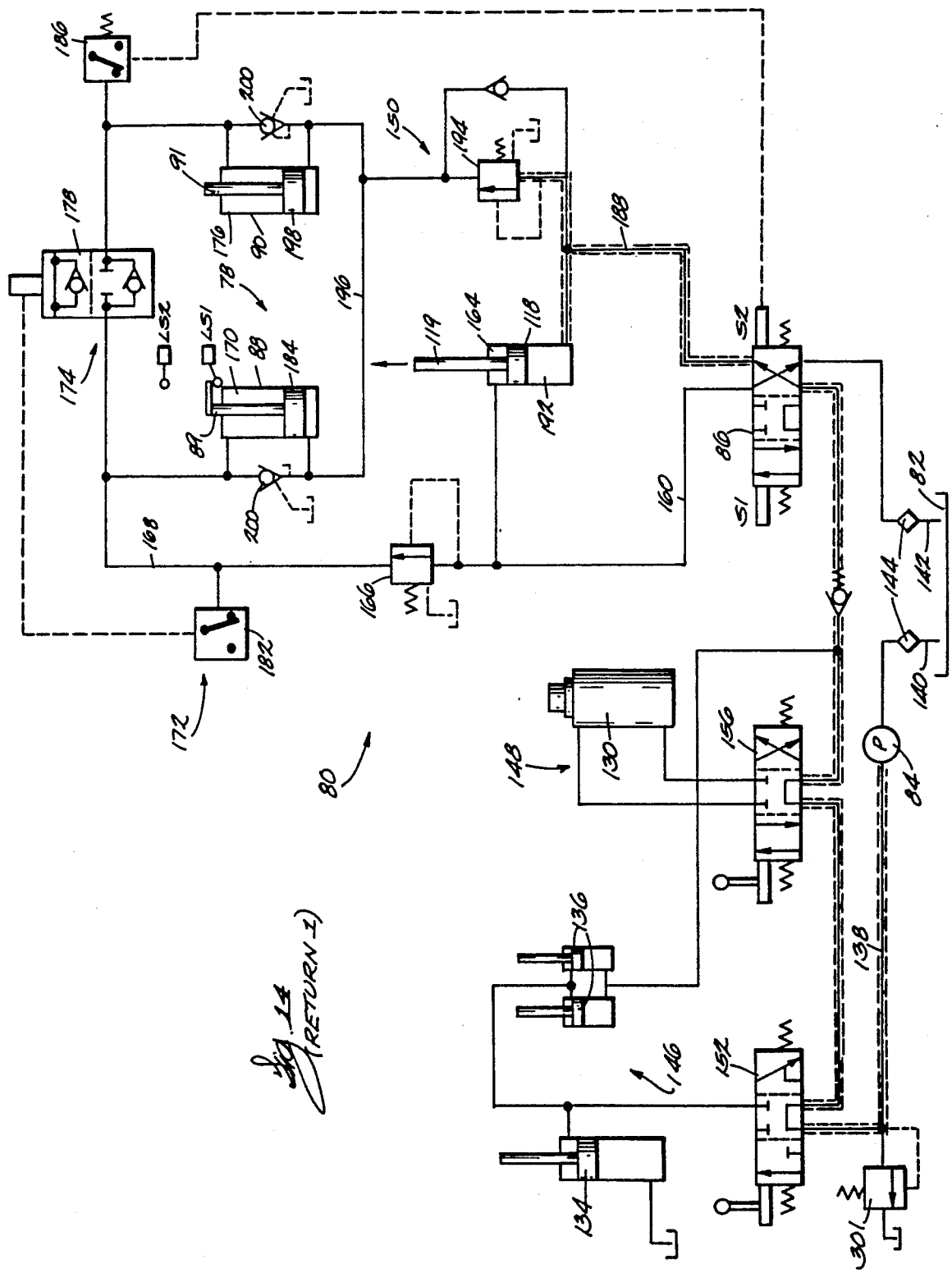
Fig. 14 (RETURN I)

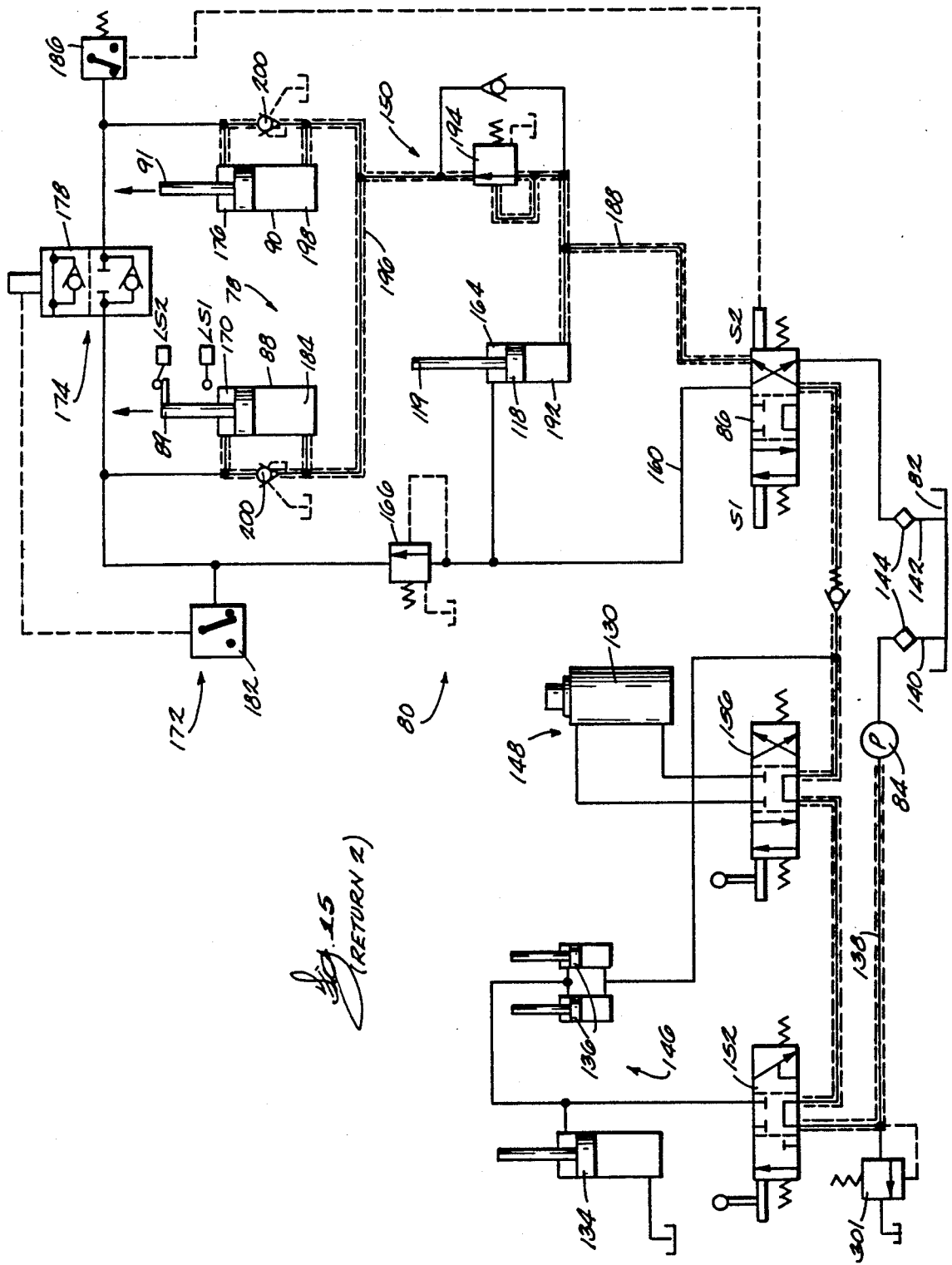
Fig. 15 (RETURN 2)

5,015,144

APPARATUS FOR LOADING MATERIALS INTO A STORAGE COMPARTMENT AND ASSOCIATED FLUID PRESSURE DELIVERY SYSTEM

FIELD OF THE INVENTION

In one aspect, the invention generally relates to systems and apparatus that are actuated in response to fluid pressure. In a more particular aspect, the invention relates to systems and apparatus for automatically loading materials into storage containers in response to fluid pressure. The invention has particular application in waste collection systems and assemblies.

BACKGROUND OF THE INVENTION

In many environments, there is a need to repeatedly load relatively large volumes of materials into a storage compartment. The collection of waste or refuse materials is a good example of one such environment, where the ability to efficiently load large volumes of materials in relatively short periods of time is often a sought-after objective.

In one common type of waste collection system, waste materials are loaded into the rear hopper of a large waste collection container carried by a truck. Rear loading assemblies are provided to periodically transfer the waste materials collected in the hopper into the main body of the container.

Such rear loader assemblies have traditionally been designed for hand loading operation. In this arrangement, waste materials are accumulated by households in individual bags. A refuse crew picks up these bags and places them into the rear hopper of the collection vehicle. The rear loading mechanism is then cycled to dump or pack the bags into the body of the collection container.

Because they are designed for conventional hand loading operation, these traditional rear loader assemblies typically are situated relatively low to the ground to be more readily accessible to the hand loading refuse crew. The volume capacity of the hopper is often sacrificed to accommodate the relatively low loading height of these traditional assemblies.

Furthermore, because these assemblies are designed for hand loading operations by a refuse crew, the cycle time required to pack the bags of waste materials in the hopper into the collection container is not an overly important design criteria, as long as the packing mechanism can keep ahead of the normal refuse crew.

Hand loading is a labor intensive and often uneconomical method of collecting waste materials, particularly in areas of large population density. Accordingly, the use of waste collection containers for curbside pickup is becoming more and more widespread. In this system, waste material is accumulated by a household in specially designed plastic or metal containers. The refuse crew empties the contents of these containers into the hopper of the collection vehicle using specially designed lift assemblies. By using these containers, larger volumes of waste materials can be collected by a refuse crew in a given period of time, compared to conventional hand loading operation.

Specially designed lift assemblies have been designed to facilitate the collection of waste materials in these containers. An example of one such lift assembly is the Zoller Rear Loader Lift. This lift assembly is generally shown in FIG. 9 of the drawings accompanying this specification.

These specially designed lift assemblies require a relatively high dumping height, when compared to the conventional loading height of hand loading systems. The loading height of conventional rear packing assemblies must therefore be raised to accommodate these specially designed lift assemblies. Yet, even then, the relatively slow packing cycle of the assemblies designed for hand loading is not fast enough to keep up with the increased volume demands of the collection container system.

One objective of this invention is to provide an efficient fluid pressure delivery system that employs a minimum of moving parts and is capable of smooth and maintenance-free operation in a rugged working environment.

Yet another objective of this invention is to provide an efficient fluid pressure delivery system having an expedited work cycle time.

Still another objective of this invention is to provide an efficient fluid pressure delivery system having a work cycle time that will adjust to the prevailing work load.

SUMMARY OF THE INVENTION

The various aspects of the invention achieve these and other objectives. One aspect of the invention provides a highly efficient system for delivering fluid pressure to operate a device. Another more particular aspect of the invention provides a highly efficient apparatus for loading materials into a storage compartment in response to fluid pressure.

The fluid pressure delivery system that embodies one aspect of the invention includes first and second means each of which is movable in response to fluid pressure to individually exert a force. The first means is linked with the second means so that the second means moves in response to movement of the first means, and vice versa.

The system further includes conduit means for conveying fluid pressure to the first and second means at a pressure that varies according to the work load encountered by the first and second means. The system also includes control means for directing the conveyance of fluid pressure in the conduit means.

In accordance with the invention, the control means senses when the system is encountering a relatively light work load or a relatively heavy work load. The supply of fluid pressure to the first and second means is adjusted accordingly to optimize the operation of the system.

More particularly, the control means includes first sensor means for sensing the variable fluid pressure in the conduit means. The control means further includes first valve means connected with the first sensor means. When the fluid pressure sensed by the first sensor means is less than a predetermined threshold value (signifying a relatively light work load situation), the first valve means serves to open the conveyance of fluid pressure to the first means, while closing the conveyance of fluid pressure to the second means. As a result, as the first and second means move together, only the first means exerts a force. In this relatively light working mode, the period of time to operate the first and second means to exert a force is minimized to the fullest extent possible, because only one of the first and second means is in fact being operated.

When the sensed fluid pressure equals or exceeds the threshold value (signifying a relatively heavy work load situation), the first valve means serves to open the conveyance of fluid pressure to both the first and second means. As a result, as the first and second means move together, both the first and second means individually exert a force. In this relatively heavy working mode, the maximum possible work force is applied by the two means working together.

The system that embodies this aspect of the invention thus provides the advantage of speed in relatively light working modes and the advantage of power in relatively heavy working modes.

In a preferred embodiment, the first and second means are each operable in a power stroke direction, controlled by the first valve means, as above described. The first and second means are also each operative in a return stroke direction. In this preferred arrangement, the control means includes second valve means operative for conveying fluid pressure to both of the first and second means to move them in the return stroke direction. The second valve means preferably works in this fashion regardless of the particular working mode of the preceding power stroke, that is, independent of the pressure sensed by the first sensor means. The first and second means are therefore quickly returned for a subsequent power stroke under all working conditions.

In a preferred embodiment, the control means includes cycling means for actuating the first valve means to move the first and second means in the power stroke direction and for actuating the second valve means to move said the first and second means in the return stroke direction.

Preferably, the fluid pressure is hydraulically created.

Another aspect of the invention provides the fluid pressure delivery system in association with an apparatus for loading materials into a storage container. In this arrangement, the apparatus includes a hopper that, during a first period of operation, receives materials and, during a subsequent period of operation, employs a movable wall to convey these materials out of the hopper and into an associated larger collection compartment. The movable wall is actuated by fluid pressure delivered by the system as previously described.

In a preferred embodiment, the fluid pressure delivery system serves to repeatedly oscillate or cycle the movable wall within a predetermined, relatively short period of time. It is thus possible to repeatedly move large volumes of materials from the hopper and into the associated storage container.

The apparatus made and operated in accordance with this aspect of the invention is particularly well suited for handling large volumes of materials in a relatively short period of time.

This aspect of the invention thus provides an apparatus that can effectively accommodate large volumes of materials without fear of overloading and in the face of relative short time constraints.

Other features and advantages of the invention will become apparent upon considering the accompanying drawings, description, and claims.

BRIEF DESCRIPTION OF THE DRAWINGS

FIG. 3 is a side section view of the loading apparatus taken generally along line 3—3 in FIG. 2;

FIG. 4 is a back view of the loading apparatus taken generally along line 4—4 in FIG. 3, with portions broken away and in section;

FIGS. 5; 5A; 6; 6A; and 7 are side section views of the loading apparatus shown in FIG. 2 being sequentially operated from a fully opened (or neutral) position (shown in FIG. 5), through a packing cycle to a fully closed position (shown in FIGS. 5A and 6), and through a return cycle back to the fully opened position (shown in FIGS. 6A and 7);

FIG. 10 is a diagrammatic view of the fluid pressure delivery system used in association with the apparatus shown in FIG. 2, with the control valve located in its first or neutral position (generally corresponding with the position of the apparatus shown in FIG. 5);

FIGS. 11 to 13 are diagrammatic views of the sequence of operation of the fluid pressure delivery system shown in FIG. 10 when the control valve is located in its second or packing position, with FIG. 12 showing the sequence in a low pressure mode and FIG. 13 showing the sequence in a high pressure mode (generally corresponding with the position of the apparatus shown in FIGS. 5A and 6); and FIGS. 14 and 15 are diagrammatic views of the sequence of operation of the fluid pressure delivery system shown in FIG. 10 when the control valve is located in its third or return position (generally corresponding with the position of the apparatus shown in FIGS. 6A and 7).

DESCRIPTION OF THE PREFERRED EMBODIMENTS

Figure 1:
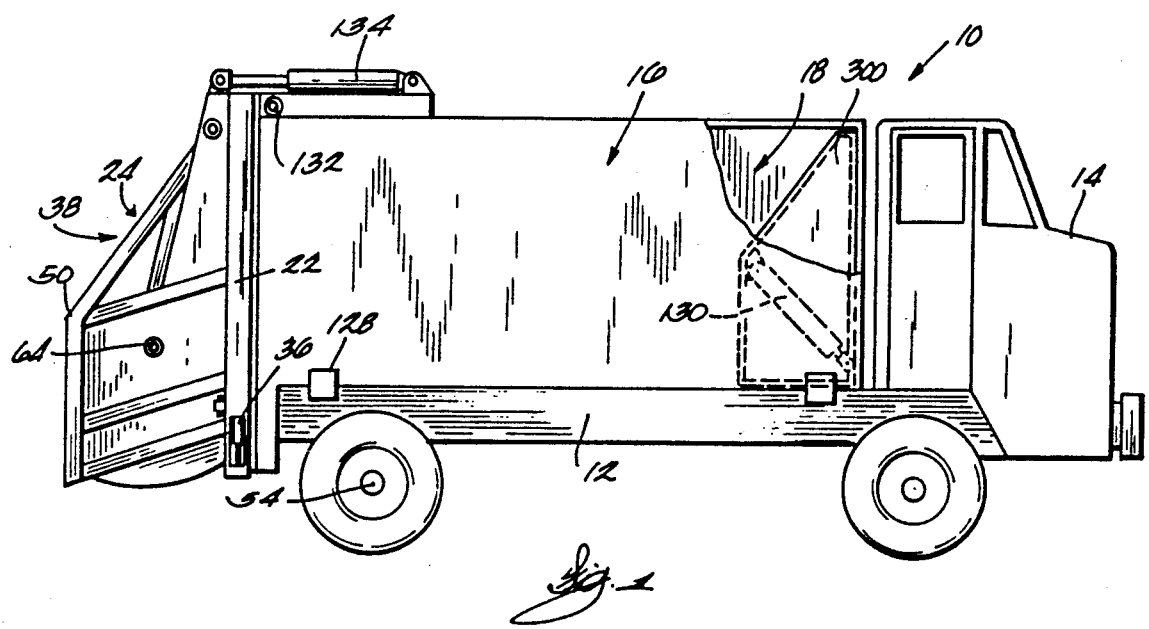
FIG. 1 is a side elevation view, with a portion broken away, of a waste collection vehicle having a loading apparatus that is actuated by fluid pressure and that includes a fluid pressure delivery system embodying the features of the invention.

A vehicle 10 for collecting and transporting waste materials is shown in FIG. 1. The vehicle 10 includes a wheeled chassis 12. A driver's compartment 14 is located at the front end of the chassis 12, as is the engine (not shown) that propels the vehicle 10.

A collection container 16 having a relatively large volume interior area 18 (for example, twenty (20) cubic yards) is carried on the chassis 12 behind the driver's compartment 14. Waste materials are loaded into the container 16 for transportation to a disposal or recycling site.

Figure 8:
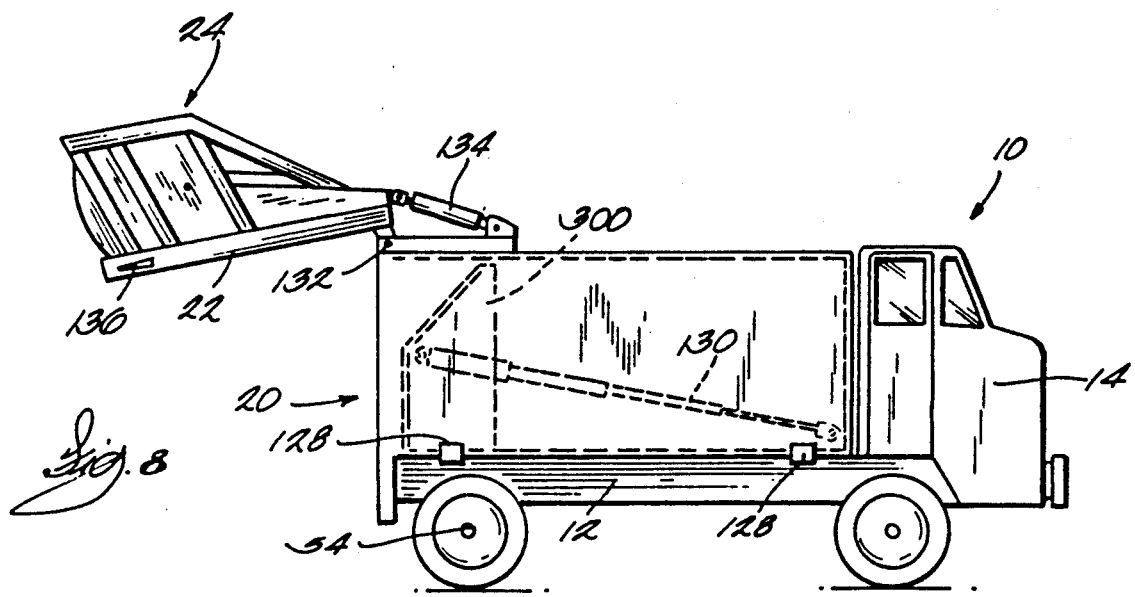
FIG. 8 is a side elevation view of the vehicle shown in FIG. 1 with the tailgate opened to permit waste to be ejected from the collection container.

As best shown in FIGS. 1 and 8, the container 16 includes a rear opening 20 through which the waste materials are loaded into and offloaded from the interior area 18. A tailgate 22 normally covers this rear opening 20 (as shown in FIG. 1). As shown in FIG. 8 and as will be described in greater detail later, the tailgate 22 extends vertically from the rear of the container 16 and can be opened for the purpose of emptying the interior area 18.

In accordance with the invention, the vehicle 10 includes an apparatus 24 carried on the tailgate for continuously receiving materials and also for loading or packing these materials into the storage area 18.

Figure 2:
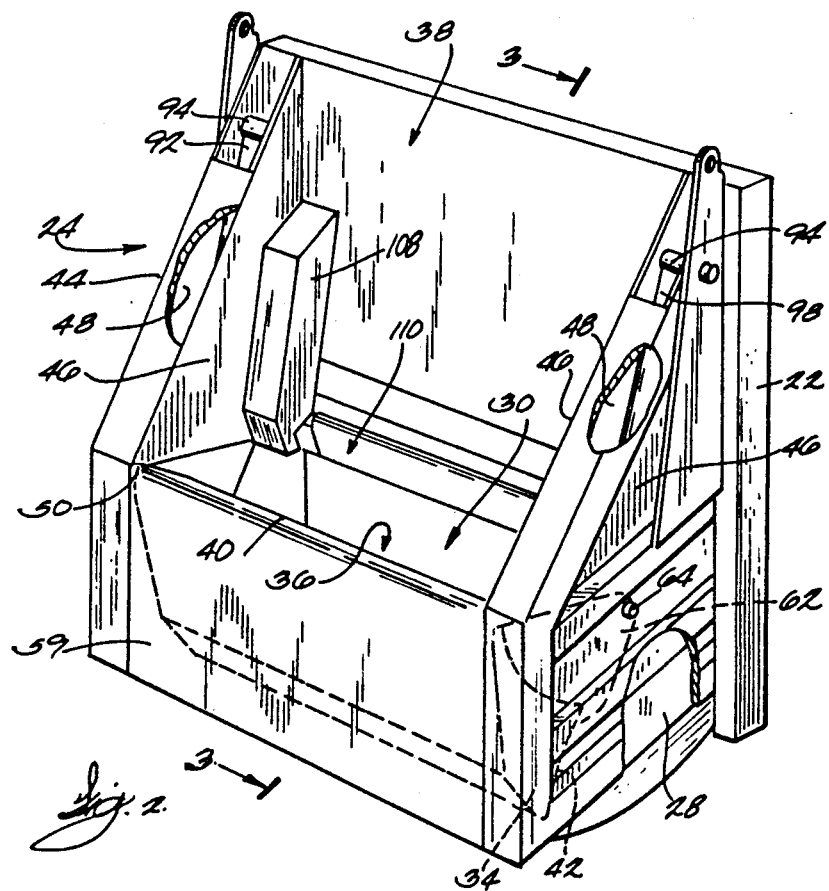
FIG. 2 is a perspective view, with portions broken away, of the loading apparatus shown in FIG. 1.

Reference is now made principally to FIGS. 2 to 4. The apparatus 24 includes walls that collectively define a hopper 28 for receiving the materials to be loaded. The hopper 28 has an inlet 30 for receiving the materials and an outlet 32 that, in use, communicates with the interior storage area 18 of the associated container 16. It is through this outlet 32 that materials are ultimately packed into the storage area 18.

The apparatus 24 also includes first panel means 34 located within the hopper 28. As best shown in FIGS. 5 to 7, the panel means 34 is movable into and out of association with the hopper inlet 30 between an opened position (shown in FIG. 5) and a closed position (shown in FIG. 6A). In the opened position, the panel means 34 is out of association of the inlet 30, and material can enter the hopper 28. In the closed position, the panel means 34 covers the hopper inlet 30.

In the illustrated and preferred embodiment, the apparatus 24 includes a holding chamber 36 in which the materials are retained when the panel means 34 is closed (see FIG. 6A). Materials are loaded into the holding chamber 36 through an opening 38 at the rear of the apparatus 24. A generally downwardly directed spill shield 40 is located adjacent to the hopper inlet 30 to direct materials in the holding chamber 36 into the hopper 28. Thus, when the panel means 34 is opened, materials retained in the holding chamber 36 fall or roll by gravity into the hopper 28.

Packing means 42 is carried by the panel means 34 (see FIGS. 2 and 3) for expelling materials from the hopper 28 through the outlet 32 during movement of the first panel means 34 from its opened position toward its closed position. This material as expelled from the hopper 28 is packed under pressure into the container 16

The apparatus 24 thus serves, as the panel means 34 opens, to introduce waste materials into the hopper 28 and, as the panel means 34 closes, to expel the materials from the hopper 28 into the storage area 18 of the associated container 16. When the panel means 34 is closed, additional materials can be loaded into the holding chamber 36 for subsequent transfer to the hopper 28 when the panel means 34 reopens. As will be described in greater detail below, the mechanism for moving the panel means 34 is simplified and streamlined to achieve a relatively rapid cycling of materials into and out of the hopper 28.

The apparatus 24 as just generally described can be variously constructed. In the illustrated embodiment (best shown in FIGS. 2 and 4), the apparatus walls define a double wall structure, with an exterior wall 44 and an interior wall 46 spaced from the exterior wall 44. The confines of the hopper 28 are defined by the exterior wall 44. The confines of the holding chamber 36 are defined by the interior wall 46. As will be described in greater detail later, the important mechanical parts of the apparatus 24 are housed in the space 48 between the two walls 44 and 46, out of contact with the materials being handled.

Figure 9:
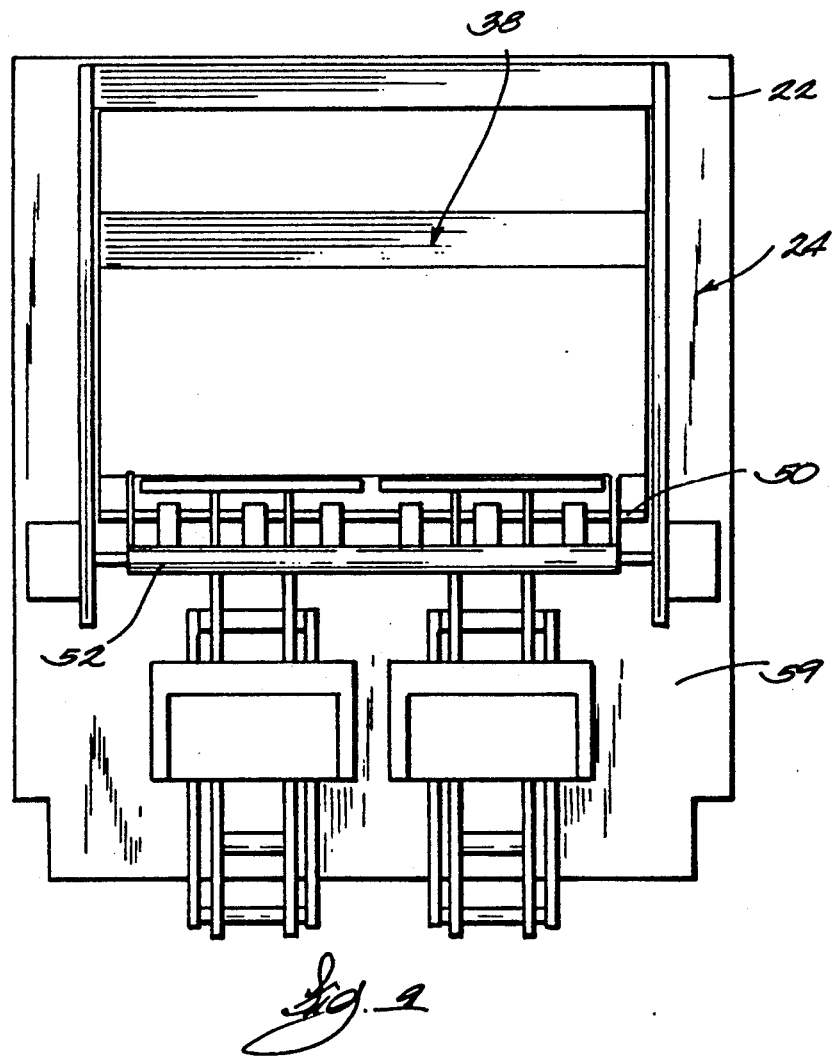
FIG. 9 is a rear view of the apparatus associated with the vehicle shown in FIG. 1, with a conventional lift assembly attached for the collection of specially designed waste collection containers.

In the illustrated embodiment (referring principally now to FIG. 1), the opening 38 to the holding chamber 36 includes a raised loading lip 50 that is spaced from the ground by approximately five and one-half (5½) feet. The raised loading lip 50 provides increased capacity for the hopper 28 and holding chamber 36. The raised loading lip 50 also accommodates, without additional modification, the attachment of conventional rear lift assemblies 52 for the collection and dumping of curbside waste collection containers (as shown in FIG. 9).

The apparatus 24 is thus particularly well suited for efficiently receiving and loading relatively large volumes of waste materials over a short period of time. These relatively large volumes are commonly encountered in a compressed time period with the increasing use of the curbside waste containers, as opposed to the hand loading of individual bags of waste materials. The lip height, however, is low enough to accommodate the occasional throw-in of a bag of refuse, if desired.

Although capable of receiving and loading relatively large volumes of waste materials, the compact configuration and streamlined mechanical operation of the apparatus 24 combine to create a relatively efficient high packing density with improved weight distribution and minimum overhang of the tailgate 22 behind the rear axle 54 of the chassis 12, as can be seen in FIG. 1.

As shown in FIG. 3, the floor 56 of the hopper 28 is formed into a generally arcuate shape. The arcuate contour of the hopper floor 56 is extended generally upwardly by a panel end section 58. The panel end section 58 is formed to have the same arc center as the hopper floor 56. The end section 58 is preferably part of the container body 16 or floor 72, and not par of the tailgate 22 itself. When the tailgate 22 is closed (see FIG. 3), a lip 55 on the hopper floor 56 rests against a lip 57 on the end section 58.

A removable panel end section 59 can be provided on the exposed rear portion of the apparatus 24 for access into the area under the panel means 34, should material get past the top, bottom, or sides of the panel 34.

In the embodiment shown in FIGS. 2 to 4, the panel means 34 takes the shape of a generally concave panel member 60 having a top wall 66 conforming to the shape and dimension of the hopper inlet 30. The panel member 60 includes side plates or ears 62 that are pivotally connected to the interior and exterior walls 46 and 48 by means of a bearing support shaft 63 and spherical bearings 64.

Preferably, the bearings 64 are enclosed within the space 48 between the double walls 44 and 46 of the apparatus 24, thereby shielded from contact with the materials in the hopper 28 and holding chamber 36. Preferably, the bearings 64 are self-lubricating to reduce maintenance and upkeep.

As best shown in FIGS. 5 to 7, the panel member 60 pivotally swings on these bearings 64 like a pendulum within the hopper 28. This movement of the panel member 60 about a single pivot axis serves to swing the top wall 66 into and out of association with the hopper inlet 30. When located in the opened position (shown in FIG. 5), the top wall 66 of the panel member 60 is located beneath the spill shield 40. When located in the closed position (shown in FIG. 6A), the top wall 66 of the panel member 60 becomes an extension of the spill shield 40. Together, the top panel wall 66 and the spill shield 40 form the floor of the holding chamber 36.

In this arrangement, the packing means 42 takes the form of a downwardly depending packer wall or scoop 70 located on the leading edge of the panel member 60. The packer wall 70 spans the width of the hopper 28. As shown in FIGS. 5 to 7, movement of the panel member 60 serves to move the packer wall 70. When the panel member 60 is in its opened position (see FIG. 5), the packer wall 70 is generally downwardly aligned with the edge of the spill shield 40, effectively forming the rear wall of the hopper 28. As the panel member 60 moves toward its closed position (see FIGS. 5A and 6), the packer wall 70 advances toward the hopper outlet 32, pushing the materials in its path along the floor of the hopper 28 and through the hopper outlet 32.

Still referring principally to FIGS. 5 to 7, as the packer wall 70 moves within the hopper 28, its path sweeps above the floor 72 of the collection container 16. The materials are pushed generally upwardly above the floor 72 through the end section 20. These materials are expelled through the hopper outlet 32 in the general direction of the ceiling 74 of the storage area 18. Materials in the hopper 28 are therefore packed into the storage area 18 above its floor 72 and in the direction of its ceiling 74.

The apparatus 24 further includes control means 76 for moving the panel member 60 between its opened position and its closed position.

The control means 76 can be variously constructed. In the illustrated and preferred embodiment, the control means 76 includes first cylinder means 78 (see FIGS. 3 and 4) that serves to move the panel member 60 between its opened and closed positions in response to fluid pressure. The control means 76 also includes a fluid pressure circuit 80 (shown in FIG. 10) for selectively supplying fluid pressure to the first cylinder means 78 to achieve the intended operation.

While various forms of fluid pressure can be used, in the illustrated and preferred embodiment, hydraulic fluid pressure actuates the cylinder means 78. The fluid pressure circuit 80 shown in FIG. 10 is therefore hydraulically actuated, including a hydraulic fluid reservoir or tank 82 and a hydraulic fluid pump 84. An electrically actuated solenoid valve 86 is arranged in line to direct the hydraulic fluid to and from the cylinder means 78.

In the illustrated and preferred embodiment, the circuit 80 serves to continually cycle or oscillate the first panel member 60 between its open and closed position in a manner to be described in greater detail below. The apparatus 24 thus serves to continually load or pack materials from the hopper 28 into the storage area 18. The relatively large volumes of waste materials that are loaded into the holding chamber 36 are rapidly introduced into the hopper 28 and ultimately packed into the storage area 18 during a relatively short period of time.

In the illustrated and preferred arrangement (best shown in FIG. 4), the first cylinder means 78 takes the form of a pair of conventional hydraulic cylinders 88 and 90, each controlling a piston rod, respectively 89 and 91. As shown in FIGS. 3 and 4, each hydraulic cylinder 88 and 90 is pivotally connected by means of a pin 92 to a mounting structure within the apparatus 24.

The piston rods 89 and 91 are each independently movable in conventional fashion between a retracted position within the associated cylinder 88 or 90 (shown in FIG. 6A) and an extended position from the associated cylinder 88 or 90 (shown in FIGS. 3 and 5) in response to hydraulic fluid pressure within the cylinder 88 or 90.

As best shown in FIGS. 3 and 4, the piston rods 89 and 91 are each pivotally connected directly to one of the side plates or ears 62 of the panel member 60 by means of spherical bearings 96. As with the bearings 64, the piston rod bearings 96 are also preferably self-lubricating.

As best shown in FIGS. 5 and 6, movement of the piston rods 89 and 91 toward the retracted position rotates the panel member 60 toward its closed position, thereby packing material from the hopper 28 into the storage area 18. Likewise, movement of the piston rods 89 and 91 toward the extended position moves the panel member 60 toward its opened position, dumping materials retained in the holding chamber 36 into the hopper 28. As will be described in greater detail later, because of the mechanical linkage, the piston rods 89 and 91 move in tandem, and fluid pressure need be supplied to only one of the associated cylinders 88 and 90 to move the panel member 60.

As before described, to protect the cylinders 88 and 90, ears 62, and associated bearings 64 and 96 from contact with the materials in the holding chamber 36 and the hopper 28, the cylinders 88 and 90 and the ears 62 of the panel member 60 are all housed in the space 48 between the double walls 44 and 46 of the apparatus 24.

As shown in FIGS. 3 and 4, a pair of movable protective shields 98 are also provided to keep the materials in the hopper 28 from entering the space 48 between the double walls of the apparatus 24 occupied by the piston rods 89 and 91. As best shown in FIG. 3, the ends 100 of the shields 98 are each pivotally connected by pins 102 to the side plates or ears 62 of the panel member 60 adjacent the spherical bearings 96 to which the piston rods 89 and 91 are connected. The other ends 104 of the shields 98 telescope into a void space 106 built into the tailgate structure.

As shown in FIG. 5, when the panel member 60 is in its opened position, the shields 98 are fully retracted from the channels 106. The shields 98 span the distance between the panel member 60 and the entrance of the channels 106, closing off the space 48 occupied by the piston rods 89 and 91 (see also FIG. 4). As the panel member 60 is moved toward its closed position, the shields 98 progressively enter the channels 106 (see FIG. 6), still spanning the now ever-diminishing distance between the channels 106 and the panel member 60. In this way, the shields 98 continuously span and close off the space 48 occupied by the piston rods 89 and 91 during movement of the panel member 60. Contact between the piston rods 89 and 91 and the contents of the hopper 28 and holding chamber 36 is thereby effectively prevented.

In the illustrated embodiment, the apparatus 24 further includes retainer means 110 that serves to hold the packed refuse in the body when the first panel means 34 moves between its opened and closed positions. While the retainer means 110 may be variously constructed, in the illustrated embodiment (see, in particular, FIGS. 2 to 4), a second panel member 112 is located adjacent to the hopper outlet 32. The second panel member 112 is pivotally connected to the inner wall 46 of the apparatus 24 by means of spherical bearings 116. As before, the bearings 116 are preferably self-lubricating.

The second panel member 112 is movable on the bearings 116 in the vicinity of the hopper outlet 32. As will be described in greater detail later, the control circuit 80 is operative for coordinating the movement of the second panel member 112 with the first panel member 60.

In the illustrated and preferred embodiment, a single second cylinder means 118 is provided for moving the second panel member 112 in response to fluid pressure. In the context of the illustrated embodiment, this fluid pressure is hydraulic pressure, and the second cylinder means 118 takes the form of a conventional hydraulic cylinder with a piston rod 119. As best shown in FIGS. 2 and 3, the hydraulic cylinder 118 is pivotally connected via a pin 120 to a bracket 122. The piston rod 119 is movable, like the piston rods 89 and 91, between a retracted position (shown in FIG. 6) and an extended position (shown in FIGS. 3 and 5).

As shown in FIG. 3, the second panel member 112 includes an ear 124 to which the piston rod 119 is connected, using a spherical bearing 126 of the nature and type previously described.

In this arrangement, movement of the piston rod 119 toward its retracted position (see FIGS. 5A and 6) serves to pivot the second panel member 112 in a first direction away from the hopper outlet 32 and into the holding chamber 36, to assume what will be referred to as a "full out" position (shown in FIG. 5A and 6). Preferable, the control circuit 80 is configured to accomplish this movement in a very short time interval of one second or less. Once the second panel member 112 is in the full out position, the first panel member 60 can be pivoted to the closed position (as shown in FIG. 6), packing refuse up into the interior area 18 of the container 16.

As shown in FIGS. 6 and 6A, opposite movement of the piston rod 119 toward its extended position (shown in FIG. 5) pivots the second panel member 112 in a second, opposite direction back toward the hopper outlet 32 and out of the holding chamber 36, to assume what will be referred to as a "full in" position (shown in FIGS. 6A and 7). Again, the control circuit 80 is preferably arranged to accomplish this movement in a time interval of one second or less. Once the second panel member 112 is in the full in position, the first panel member 60 can be pivoted to the open position (shown in FIG. 7).

The second panel member 112 serves several purposes. First, when in its full in position (see FIGS. 6A and 7), the second panel member 112 acts as a retainer panel to hold the packed refuse in the interior area 18 as the first panel member 60 is pivoted from its closed position back to its open position.

Second, cyclical movement of the second panel member 112 between its full in and full out positions serves to keep the refuse in the holding chamber 36 in a state of flux, helping to prevent refuse from bridging and blocking the hopper inlet 30.

Third, the provision of the second panel member 112 allows the dimension of the hopper inlet 30 to be maximized while minimizing the rear axle-to-end of tailgate dimension to a minimum. This facilitates the passage of bulky materials by gravity from the holding chamber 36 into the hopper 28.

In the illustrated and preferred embodiment, the second panel member 112 moves independently of the first panel member 60. Therefore, should material become lodged and prevent movement of the second panel member 112 in its first or second direction, movement of the first panel member 60 will proceed unimpeded. Damage or breakage of the interior actuating mechanisms of the apparatus 24 is thereby avoided.

To protect the cylinder 118, piston rod 119, side ear 124, and bearing 126 associated with the second panel member 112, these mechanical components are all housed within a protective covering 108 on the apparatus 24 (see FIGS. 2 and 3).

All the bearings 64, 96, 116, and 126 can also include conventional Belleville spring washers to act as dirt shields.

Referring now to FIGS. 1 and 8, in the illustrated embodiment, the storage container 16 is permanently affixed to the chassis 12 by means of tie-down brackets 128. A conventional ejector panel 300 is movable within the area 18 to push the refuse out of the container 16 at a transfer station, landfill, or recycling center. The ejector panel 300 is actuated by a conventional double-acting telescopic hydraulic cylinder 130 that is controlled by the valve 156 (see FIG. 10).

The tailgate 22 is pivotally attached by means of a hinge 132 to the storage container 16. The tailgate 22 can therefore be moved between a closed position (shown in FIG. 1) and an opened position (shown in FIG. 8). One or more tailgate cylinders 134 are provided for opening and closing the tailgate 22. One or more locking cylinders 136 are also provided for locking the tailgate 22 in its closed position. The tailgate cylinders 134 and locking cylinders 136 are controlled by the valve 152 (see FIG. 10).

FIG. 8 shows the tailgate 22 raised and the ejector panel 300 situated at the rear of the container 16 to offload materials through the rear opening 20.

The apparatus 24 and associated container 16 can be variously dimensioned according to the intended work requirements. In one illustrative embodiment, the apparatus 24 is about eighty-four (84) to ninety-six (96) inches wide to match the width of conventional tailgates in the United States and in foreign countries. In this arrangement, the apparatus has an interior capacity (including both the holding chamber 36 and the hopper 28) of about four (4) to five (5) cubic yards. The capacity of the hopper 28 alone is about one and one-half (1½) cubic yards.

The compact design of the apparatus 24 in the above-described illustrative embodiment is relatively lightweight. The apparatus 24 as above described (including the weight of the tailgate itself) weighs less than three thousand (3000) pounds. Conventional rear loading assemblies weigh typically weigh forty-five hundred (4500) pounds.

Furthermore, the geometry of the apparatus 24 is such that its center of gravity is well forward so that the distribution of weight on the chassis 12 is enhanced.

It should also be noted that the mechanisms for moving the first and second panel members 60 and 112 are straightforward and streamlined, each effectively relying upon a single pivot point (i.e. bearings 64 for the first panel member 60 and bearings 116 for the second panel member 112). The mechanisms thereby require a minimum of maintenance and are well suited for operation in rugged and dirty environments.

The apparatus 24 that embodies the features of the invention has been described in the context of its use in association with a waste collection system. It should be appreciated, however, that the invention is applicable for use in diverse work environments and is not limited to the specific application described in this specification.

Attention is now directed to FIGS. 10 to 15 and the specific details of the hydraulic control circuit 80 used in association with the apparatus 24. The circuit 80 includes the already mentioned source or reservoir of hydraulic fluid or oil 82. A main hydraulic fluid supply conduit 138 includes a supply end 140 for drawing fluid from the reservoir 82 and return end 142 for conveying fluid back to the reservoir 82. Hydraulic fluid is conveyed through the main supply conduit 138 by means of the pump 84, which in the illustrated and preferred embodiment is a fixed displacement pump. In line filters 144 are also preferably provided near the supply and return ends 140 and 142 of the conduit 138. In addition, a circuit relief valve 301 is provided in the conduit 138.

The circuit 80 further includes three branch conduits 146, 148 and 150. The first branch conduit 146 supplies hydraulic fluid pressure to operate the tailgate cylinder 134 and the tailgate locking cylinders 136, both of which have been already described. The second branch conduit 148 supplies hydraulic fluid pressure to the double acting telescopic ejector cylinder 130, which has also been already described. The third branch conduit 150 supplies hydraulic fluid pressure to the previously described cylinders 88, 90, and 118 associated with the apparatus 24.

The supply of hydraulic fluid pressure to the branch conduits 146, 148, and 150 is selectively controlled by three previously mentioned valves 86, 152 and 156. Each valve 86, 152, and 156 is positioned in line with the main supply conduit 138 and the respective branch conduit 146, 148, and 150. Valve 86 is depicted as a solenoid controlled three position directional valve of conventional construction. Valves 152 and 156 are depicted as mechanically controlled three position directional valves of conventional construction. Alternatively, mechanical valves could be used instead of solenoid valves, and vice versa.

Attention is now more particularly directed the means for conveying fluid pressure through the third branch conduit 150 that embodies various features of the invention.

As shown in FIGS. 10 to 15, the associated solenoid valve 86 is movable into three positions to control the flow of hydraulic fluid pressure in the circuit. In the first, or neutral, position (shown in FIG. 10) hydraulic fluid pressure is prevented from entering the third branch conduit 150 from the main supply line 138.

In the second, or packing, position (shown in FIGS. 11 to 13), hydraulic fluid pressure is conveyed from the main supply line 138 through the third branch conduit 150 to retract the piston rods 89 and 91. The first panel member 60 is thereby moved from its opened position (shown in FIG. 5) into its closed position (shown in FIG. 6A), also thereby moving the packing wall 70 to expel materials from the hopper 28 and pack these materials into the container 16.

When the valve 86 is in its second or packing position, the fluid pressure also retracts the piston rod 119. The second panel member 112 is thereby also moved in its first direction into its full out position in the holding chamber 36 (see FIG. 6). The particular sequence of moving the first and second panel members 60 and 112 will be described in greater detail later.

In the third, or return, position (shown in FIGS. 14 and 15), hydraulic fluid pressure is conveyed from the main supply conduit 138 through the third branch conduit 150 to extend the piston rods 89 and 91. The first panel member 60 is thereby moved from its closed position (FIGS. 6 and 6A) back to its opened position (FIG. 7), thereby emptying materials in the holding chamber 36 into the hopper 28. When the valve 86 is in the third position, the fluid pressure also extends the piston rod 119. The second panel member 112 is also thereby moved in the second direction back into its full in position in the hopper outlet 32 (see FIG. 7). The particular sequence of moving the first and second panel members 60 and 112 will be described in greater detail later.

The circuit 80 includes, in association with the valve 86, two valve control solenoids, designated as S1 and S2 in FIGS. 10 to 15. When neither solenoid S1 nor S2 is activated, the valve 86 is positioned in its center, or neutral position. When solenoid S1 is activated, the valve 86 is moved into its second, or packing position. When solenoid S2 is activated, the valve 86 is moved into its third, or return, position.

Assume that the apparatus 24 is in the position shown in FIG. 5, with the panel member 60 in its opened position, the panel member 112 in its full in position, and the control circuit 80 not actuated. Pushing a start button (not shown) will energize solenoid S1. This in turn shifts the valve 86 from its neutral position into its packing position.

As shown in FIG. 11, hydraulic oil is first directed through the valve 86 through the conduit path 160 and into the piston rod end 164 of the cylinder 118. The fluid pressure exerted by the hydraulic oil moves the piston rod 119 toward its retracted position (shown by an arrow in FIG. 11), thereby moving the second panel member 112 into its full in position (shown in FIG. 5A).

When the piston rod 119 is completely stroked in its retracted position, the sequence valve 166 is automatically activated. As next shown in FIG. 12, hydraulic oil is then directed through the conduit path 168 directly into the piston rod end 170 of the cylinder 88. The fluid pressure exerted by the hydraulic oil moves the piston rod 89 toward its retracted position (shown by an arrow in FIG. 12), moving the first panel member 60 toward its closed position (as shown in FIG. 6). In accordance with one aspect of the invention, the other cylinder 90 is maintained in a "float" position, and the associated piston rod 91 moves in tandem toward its retracted position with the other piston rod 89 in response to the movement of the first panel member 60. In this "float" condition, hydraulic oil is exhausted from the base end 198 to the piston rod end 176 of the cylinder 90 through the pilot operated check valve 200, with surplus oil returning to the reservoir 82. During this cycle, material is being expelled from the hopper 28 and packed into the container 16.

In accordance with another aspect of the invention, the third branch conduit 150 includes first means 172 for selectively supplying fluid pressure to the piston rod end 170 of only the cylinder 88 when the fluid pressure in the conduit path 168 is less than a predetermined threshold value (this being shown in FIG. 12). However, when the fluid pressure equals or exceeds this predetermined threshold value, the third branch conduit 150 includes second means 174 for supplying fluid pressure to the piston rod ends 170 and 176 of both cylinders 88 and 90 (this being shown in FIG. 13).

Thus, the first and second means 172 and 174 provide a fast packing cycle time when the material in the hopper is light and easily packed, as all the pump flow is directed to one packing cylinder. However, when more packing force is required, the circuit automatically increases the packing force by directing the pump flow to two packing cylinders, in the process doubling the packing cycle time.

The first and second means 172 and 174 may be variously constructed and arranged. In the illustrated embodiment, a two position solenoid valve 178 is positioned in line with the conduit path 180 between the piston rod ends 170 and 176 of the cylinder 88 and the cylinder 90. This valve 178 is operative between a normally closed position (shown in FIG. 12), blocking the flow of hydraulic oil to the piston rod end 176 of the cylinder 90, and an opened position (shown in FIG. 13), permitting the flow.

A pressure switch 182 monitors the fluid pressure in the conduit path 168. The pressure switch 182 is operatively connected with the valve 178. When the pressure in the conduit path 168 is less than the predetermined threshold value, the valve 178 is maintained in its normally closed position, as shown in FIG. 12. Hydraulic oil is therefore conveyed only into the piston rod end 170 of the cylinder 88. As before described, the other cylinder 90 is maintained in a "float" position, and the associated piston rod 91 moves toward its retracted position along with the other piston rod 89 in response to the movement of the first panel member 60.

This low pressure mode of operation will occur when the cylinder 88 to which hydraulic fluid pressure is being conveyed experiences a relatively light load of materials in the hopper 28, requiring relatively little work force to pack these materials into the storage area 18. In this low pressure mode, the period of time required to move the first panel member 60 from its opened to its closed position, thereby expelling the materials from the hopper 28, is minimized to the fullest extent possible, because hydraulic pump oil is being directed to only one cylinder (i.e. cylinder 88).

When the cylinder 88 experiences a heavier load of materials in the hopper 28, requiring a greater work force to pack these materials, the fluid pressure in the conduit path 168 will rise accordingly. When the pressure sensed by the pressure monitor 182 equals or exceeds the threshold value, the pressure monitor 182 activates the solenoid valve 178, moving it from its normally closed position into its opened position, as shown in FIG. 13. Hydraulic oil is thereby conveyed into the piston rod ends 170 and 176 of both cylinders 88 and 90. In this high pressure mode of operation, the maximum possible work force is thereby applied by the cylinders 88 and 90 working together. Of course, in the high pressure mode of operation, the speed of the apparatus 24 in the packing cycle will be effectively cut in half compared to its speed in the low pressure mode of operation, as hydraulic pump oil is being directed to two instead of just one cylinder.

The threshold value can vary according to the anticipated work demands of the apparatus 24. In an illustrative embodiment, the threshold value is about two thousand (2000) pounds per square inch.

Whether in its low or high pressure mode of operation, the piston rods 89 and 91 of the cylinders 88 and 90 will move toward their fully retracted position until a limit switch, designated LS1 in the drawings, is activated. Limit switch LS1 will activate solenoid S2, moving the valve 86 into its third, or return position (shown in FIGS. 14 and 15).

Should packed materials interfere with the movement of the first panel member 60, preventing contact with the limit switch LS1, a second pressure switch 186 in the conduit path 180 will sense the increasing pressure. Should this pressure rise above a second threshold amount, the second pressure switch 186 will be activated to activate switch S2.

Attention is next directed to FIG. 14. When switch S2 is activated, moving the valve 86 into its return position, hydraulic oil is first directed via the conduit path 188 to the base end 192 of the cylinder 118. The fluid pressure exerted by the hydraulic oil moves the piston rod 119 toward its extended position (shown by an arrow in FIG. 13), moving the second panel member 112 into its full in position (shown in FIG. 6A).

When the piston rod 119 is completely stroked out in its extended position, sequence valve 194 is automatically activated. As next shown in FIG. 15, hydraulic oil is then directed through the conduit path 196 into the base ends 184 and 198 of both of the cylinders 88 and 90. The fluid pressure exerted by the hydraulic oil moves each of the piston rods 89 and 91 toward its fully extended position (shown by arrows in FIG. 15), returning the first panel member 60 back toward its opened position (shown in FIG. 7). At the same time, material retained in the holding chamber 36 is emptied into the hopper 28.

In the return mode of operation, both cylinders 88 and 90 are in their regenerative mode, as the pilot check valves 200 open allowing the displaced rod end oil to be added to the pump oil. Only the relatively small amount of oil displaced by the piston rods 89 and 91 need be supplied by the pump 84 to complete this cycle. Thus, the return cycle is extremely fast.

The piston rods 89 and 91 continue to move toward their fully extended position until contact is made with the limit switch designated LS2 in the drawings. Limit switch LS2 will activate solenoid S1, moving the valve 86 back into its first, or packing, position.

The sequence of operation through the packing and return cycles as above described is automatically repeated until a stop operation button (not shown) is pushed by the operator, returning the valve 86 to its neutral position. Subsequent operation will require pushing the start button.

The period of time required to cycle the cylinders will vary according to the size of the cylinders 88/90/118 and the pumping rate of the pump 84. In an illustrative arrangement, the cylinders 88 and 90 have a five (5) inch bore; a two (2) inch piston rod 89 and 91; and a twenty-four (24) inch stroke. The pump 84 has a pumping rate of approximately twenty-five (25) gallons per minute. In this arrangement, the cylinders 88 and 90 can be cycled in the packing mode to move the piston rods 89 and 91 from their fully extended to their fully retracted positions in about 4.1 seconds in the low pressure mode and about 8.2 seconds in the high pressure mode. The cylinders 88 and 90 can be cycled in the return mode to move the piston rods 89 and 91 to their fully extended position in about 2 seconds.

It is estimated that approximately one half of the packing cycle or cycles will be in the low pressure mode, with the remaining period or periods in the high pressure mode. This results in an average packing cycle time of 6.15 seconds. Allowing a one second time interval to stroke the cylinder 118; an additional one second time interval for valve shifting; and the two second retract time interval, a total cycle time of 10.15 seconds is provided. With this cycle time, 5.9 cycles can be performed each minute. With a hopper capacity of about one and one-half (1.5) cubic yards, the apparatus is therefore capable of packing 8.85 cubic yards of waste materials per minute.

The invention has been shown in association with a fluid pressure circuit in which the work stroke is accomplished during the retraction of a piston rod into a cylinder. It should be appreciated that the invention is applicable for use with a fluid pressure circuit in which the work stroke occurs during the extension of the associated piston rod from the cylinder. It should also be appreciated that the invention is applicable for use in a fluid circuit whenever multiple fluid pressure exerting devices are used.

Various features of the invention are set forth in the following claims.

We claim:

1. A fluid pressure system comprising
first and second means each movable in response to fluid pressure to individually exert a force,
linkage means coupling said first means with said second means and being operative for moving said second means in response to movement of said first means, and vice versa.
conduit means for conveying fluid pressure to said first and second means at a pressure that varies according to the work load encountered by said first and second means, the system being free of other means for conveying fluid pressure to said first and second means, and
control means operative for directing the conveyance of fluid pressure in said conduit means including
first sensor means for sensing the variable fluid pressure in said conduct means, and
first valve means connected with said first sensor means and being operative, only when the sensed fluid pressure is less than a predetermined threshold value, for opening the conveyance of fluid pressure to said first means while closing the conveyance of fluid pressure to said second means so that, as said first and second means move together, only said first means exerts a force, said first valve means being further operative, only when the sensed fluid pressure equals or exceeds said threshold value, for opening the conveyance of fluid pressure to both said first and second means so that, as said first and second means move together, both said first and second means individually exert a force.

2. A fluid pressure system comprising
first and second means each movable in response to fluid pressure to individually exert a force,
linkage means coupling said first means with said second means and being operative for moving said second means in response to movement of said first means, and vice versa,
conduit means for conveying fluid pressure to said first and second means at a pressure that varies according to the work load encountered by said first and second means, said conduit means including a single fluid pressure pump, and
control means operative for directing the conveyance of fluid pressure in said conduit means including
first sensor means for sensing the variable fluid pressure in said conduit means, and
first valve means connected with said first sensor means and being operative, when the sensed fluid pressure is less than a predetermined threshold value, for opening the conveyance of fluid pressure to said first means while closing the conveyance of fluid pressure to said second means so that, as said first and second means move together, only said first means exerts a force, said first valve means being further operative, when the sensed fluid pressure equals or exceeds said threshold value, for opening the conveyance of fluid pressure to both said first and second means so that, as said first and second means move together, both said first and second means individually exert a force.

3. A new system according to claim 2 wherein said fluid pressure pump is a fixed displacement pump.

4. A fluid pressure system comprising
first and second piston means each movable in response to fluid pressure from an initial position in a power stroke direction to exert a force and in a return stroke direction to return to said initial position,
linkage means operative coupling said first piston means with said second piston means so that said second piston means moves in its power stroke direction when said first piston means moves in its power stroke direction, and vice versa,
conduit means for conveying fluid pressure to said first and second piston means at a pressure that varies according to the work load encountered by said first and second piston means when operated in their respective power stroke direction, said conduit means including a single fluid pressure pump, and
control means operative for directing the conveyance of fluid pressure in said conduit means including
first sensor means for sensing the variable fluid pressure in said conduit means,
first valve means connected with said first sensor means and being operative, when the sensed fluid pressure is less than a predetermined threshold value, for opening the conveyance of fluid pressure to said first piston means while closing the conveyance of fluid pressure to said second piston means so that, as said first and second piston means move together in their respective power stroke direction, only said first piston means exerts a force, said first valve means being further operative, when the sensed fluid pressure equals or exceeds said threshold value, for opening the conveyance of fluid pressure to both said first and second piston means so that, as said first and second piston means move together in their respective power stroke direction, both said first and second piston means individually exert a force, and
second value means for selectively conveying fluid pressure to move said first and second piston means together in their respective return stroke direction.

5. A system according to claim 4 wherein said fluid pressure pump is a fixed displacement pump.

6. An apparatus for loading materials into a storage compartment comprising
wall means defining a hopper for receiving the materials to be loaded, said wall means further defining an inlet for receiving the material into said hopper and an outlet that, in use, communicates with the storage compartment.
first panel means operative for movement within said hopper between an opened position permitting material to enter said hopper inlet and a closed position closing said hopper inlet;
packing means on said first panel means for expelling materials from said hopper through said outlet during movement of said first panel means from said opened position toward said closed position; and
first and second means each movable in response to fluid pressure to individually exert a force,
linkage means coupling said first and second means with said first panel means and being operative for moving said first panel means toward said closed position in response to the exertion of force by at least one of said first and second means, said linkage means being further operative for moving said second means in response to movement of said first means, and vice versa, conduit means for conveying fluid pressure to said first and second means at a pressure that varies according to the work load encountered by said first and second means as said first penal means is moved toward its closed position, said conduit means including a single fluid pressure pump, and control means operative for directing the conveyance of fluid pressure in said conduit means including first sensor means for sensing the variable fluid pressure in said conduit means, and first valve means connected with said first sensor means and being operative, when the sensed fluid pressure is less than a predetermined threshold, for opening the conveyance of fluid pressure to said first means while closing the conveyance of fluid pressure to said second means so that, as said first and second means move together to move said first panel means toward its closed position, only said first means exerts a force, said first valve means being further operative, when the sensed fluid pressure equals or exceeds said threshold valve, for opening the conveyance of fluid pressure to both said first and second means so that, as said first and second means move together to move said first panel means toward its closed position, both said first and second means individually exert a force.

7. A system according to claim 6 wherein said fluid pressure pump is a fixed displacement pump.

8. A fluid pressure system according to claim 1 or 2 wherein said first means comprises first piston means operative for movement between a first operative position and a second operative position in response to fluid pressure, and wherein said first valve means is operative in response to the pressure sensed by said first sensor means for conveying fluid pressure to move said first piston means toward said first operative position.

9. A fluid pressure system according to claim 8.
wherein said control means includes second valve means operative for conveying fluid pressure to move said first piston means toward said second operative position:

10. A fluid pressure system according to claim 9 wherein said second valve means operates independent of said first sensor means.

11. A fluid pressure system according to claim 9 wherein said control means includes cycling means for actuating said first valve means to move said first piston means from said second operative position toward said first operative position and for actuating said second valve means to move said first piston means from said first operative position toward said second operative position.

12. A fluid pressure system according to claim 8 wherein said first piston means includes a cylinder member and a piston member movable in response to fluid pressure within said cylinder between said first operative position, in which said piston member is generally retracted within said cylinder, and said second operative position, in which said piston member is generally extended from said cylinder.

13. A fluid pressure system according to claim 1 or 2 wherein said fluid pressure is hydraulic fluid pressure.

14. A fluid pressure system according to claim 1 or 2 wherein said first and second means are each moveable between a first operative position and a second operative position in response to fluid pressure, wherein said linkage means couples said first and second means so that movement of said first means toward its respective first operative position moves said second means toward its respective first operative position, and vice versa.

15. A fluid pressure system according to claim 14 wherein said first valve means is operative in response to the pressure sensed by said first sensor means for conveying fluid pressure to move said first and second means toward their respective first operative positions.

16. A fluid pressure system according to claim 9 wherein said control means includes second valve means for selectively conveying fluid pressure to move said first and second means toward their respective second operative positions.

17. A fluid pressure system according to claim 16 wherein said second valve means conveys fluid pressure to both of said first and second means independent of said first sensor means.

18. A fluid pressure system according to claims 14 wherein said first and second means each includes a cylinder member and a piston member movable in response to fluid pressure with said cylinder between said first operative position, in which said piston member is generally retracted within said cylinder, and said second operative position, in which said piston member is generally extended from said cylinder.

19. A fluid pressure system according to claim 14 wherein said fluid pressure is hydraulic.

20. A fluid pressure system comprising first and second piston means each movable in response to fluid pressure from an initial position in a power stroke direction to exert a force and in a return stroke direction to return to said initial position.

linkage means operative coupling said first piston means with said second piston means so that said second piston means moves in its power stroke direction when said first piston means moves in its power stroke direction, and vice versa, conduit means for conveying fluid pressure to said first and second piston means at a pressure that varies according to the work load encountered by said first and second piston means when operated in their respective power stroke direction, the system being free of other means for conveying fluid pressure to said first and second piston means, and control means operative for directing the conveyance of fluid pressure in said conduit means including first sensor means for sensing the variable fluid pressure in said conduit means, first valve means connected with said first sensor means and being operative, only when the sensed fluid pressure is less than a predetermined threshold value, for opening the conveyance of fluid pressure to said first piston means while closing the conveyance of fluid pressure to said second piston means so that, as said first and second piston means move together in their respective power stroke direction, only said first piston means exerts a force, said first valve means being further operative, only when the sensed fluid pressure equals or exceeds said threshold value, for opening the conveyance of fluid pressure to both said first and second piston means so that, as said first and second piston means move together in their respective power stroke direction, both said first and second piston means individually exert a force, and second valve means for selectively conveying fluid pressure to move said first and second piston means together in their respective stroke direction.

21. A fluid pressure system according to claim 4 wherein said second valve means conveys fluid pressure to both of said first and second piston means independent of said first sensor means.

22. A fluid pressure system according to claim 20 or 4 wherein said control means includes cycling means for actuating said first valve means to move said first and second piston means together in their respective power stroke direction for actuating said second valve means to move said first and second piston means together in their respective return stroke direction.

23. A fluid pressure system according to claim 22 wherein said control means includes limit means for sensing the position of said piston means, and wherein said cycling means is operative for selectively actuating said first and second valve means in response to positions sensed by said limit means.

24. A fluid pressure system according to claim 23 wherein said control means includes second sensor means for sensing pressure in said conduit means, and wherein said cycling means is operative for actuating said second valve means when the pressure sensed by said second sensor means exceeds a predetermined ceiling amount independent of the operation of said limit means.

25. A fluid pressure system according to claim 20 or 4 wherein said first and second piston means each includes a cylinder member and a piston member movable in response to fluid pressure within said cylinder between a first operative position, in which said piston member is generally retracted within said cylinder, and a second operative position, in which said piston member is generally extended from said cylinder, and wherein, said first and second piston means are each moved in its respective power stroke direction when its associated piston member is moved toward said first operative position direction and in its respective return stroke direction when its associated piston member is moved toward said second operative position.

26. A fluid pressure system according to claim 20 or 4 wherein said fluid pressure is hydraulic fluid pressure.

27. An apparatus for loading materials into a storage compartment comprising wall means defining a hopper for receiving the materials to be loaded, said wall means further defining an inlet for receiving the materials into said hopper and an outlet that, in use, communicates with the storage compartment;

first panel means operative for movement within said hopper between an opened position permitting material to enter said hopper inlet and a closed position closing said hopper inlet;

packing means on said first panel means for expelling material from said hopper through said outlet during movement of said first panel means from said opened position toward said closed position; and first and second means each movable in response to fluid pressure to individually exert a force, linkage means coupling said first and second means with said first panel means and being operative for moving said first panel means toward said closed position in response to the exertion of force by at least one of said first and second means, said linkage means being further operative for moving said second means in response to movement of said first means, and vice versa, conduit means for conveying fluid pressure to said first and second means at a pressure that varies according to the work load encountered by said first and second means as said first panel means is moved toward its closed position, the apparatus being free of other means for conveying fluid pressure to said first and second means, and control means operative for directing the conveyance of fluid pressure in said conduit means including first sensor means for sensing the variable fluid pressure in said conduit means, and first valve means connected with said first sensor means and being operative, only when the sensed fluid pressure is less than a predetermined threshold value, for opening the conveyance of fluid pressure to said first means while closing the conveyance of fluid pressure to said second means so that, as said first and second means move together to move said first panel means toward its closed position, only said first means exerts a force, said first valve means being further operative, only when the sensed fluid pressure equals or exceeds said threshold value, for opening the conveyance of fluid pressure to both said first and second means so that, as said first and second means move together to move said first panel means toward its closed position, both said first and second means individually exert a force.

28. A apparatus according to claim 27 or 6 wherein said linkage means couples said first and second means with said first panel means so that said first and second means are also operative for moving said first panel means toward said opened position, and wherein said control means includes second valve means for selectively conveying fluid pressure to said first and second means to move said first panel means toward said closed position.

29. An apparatus according to claim 28 wherein said control means is operative for actuating said first and second valve means to move said first panel means from said opened position toward said closed position and then return said first panel means from said closed position toward said opened position within a predetermined time interval.

30. An apparatus according to claim 28 wherein said second valve means conveys fluid pressure to both of said first and second means independent of said first sensor means.

31. An apparatus according to claim 28
wherein said first and second means each includes a cylinder member and a piston member movable in response to fluid pressure within said cylinder between a first operative position, in which said piston member is generally retracted within said cylinder, and a second operative position, in which said piston member is generally extended from said cylinder, and
wherein said linkage means connects said piston members of said first and second means to said first panel means so that movement of said piston members toward said first operative position moves said first panel means toward its closed position and movement of said piston members toward said second operative position moves said first panel means toward its opened position.

32. An apparatus according to claim 27 or 6
wherein said fluid pressure is hydraulic fluid pressure.

* * * * *